United States Patent [19]
Haley

[11] 4,222,591
[45] Sep. 16, 1980

[54] MECHANISM FOR CLAMPING PLATES

[75] Inventor: Frank P. Haley, Upland, Calif.

[73] Assignee: FMC Corporation, San Jose, Calif.

[21] Appl. No.: 882,715

[22] Filed: Mar. 2, 1978

[51] Int. Cl.$^2$ ............................................. F16L 23/00
[52] U.S. Cl. ...................................... 285/18; 285/320; 285/364; 285/DIG. 21
[58] Field of Search ......... 285/18, 311, 364, DIG. 21, 285/310, 320

[56] References Cited
U.S. PATENT DOCUMENTS

| | | | |
|---|---|---|---|
| 48,038 | 6/1865 | Barnard | 285/364 X |
| 1,219,849 | 3/1917 | Norris | 285/312 X |
| 1,991,343 | 2/1935 | Ball | 285/311 X |
| 3,126,213 | 3/1964 | Lewis | 285/311 X |
| 3,442,535 | 6/1969 | Frohlich | 285/364 X |
| 3,445,127 | 5/1969 | Clarke | 285/311 X |
| 3,489,434 | 1/1970 | Haley | 285/311 X |
| 3,661,408 | 5/1972 | Gibbons | 285/18 |
| 3,799,519 | 3/1974 | Yamazoe | 285/18 |
| 4,004,611 | 1/1977 | Friedell | 285/320 X |
| 4,035,006 | 7/1977 | Isoyama | 285/364 |

FOREIGN PATENT DOCUMENTS

| | | | |
|---|---|---|---|
| 508779 | 2/1952 | Belgium | 285/311 |
| 532596 | 8/1931 | Fed. Rep. of Germany | 285/DIG. 21 |
| 314569 | 7/1929 | United Kingdom | |

Primary Examiner—Thomas F. Callaghan
Attorney, Agent, or Firm—L. B. Guernsey; W. W. Ritt, Jr.

[57] ABSTRACT

Mechanism for securing the end plates, or flanges, of two in-line pipe sections is disclosed. A clamp member, having two jaws which remain fixed during clamping, is pivotally mounted on a standard secured to one of the pipes. A rotary locking member has an arcuate wedge segment and an abutment surface. The locking member is powered to rotate in one direction, to raise the clamp member by engagement of said abutment surface therewith. The locking member is powered to rotate in the opposite direction to release the clamp member for movement over the flanges and to wedge the wedge segment with said flanges between said jaws.

8 Claims, 10 Drawing Figures

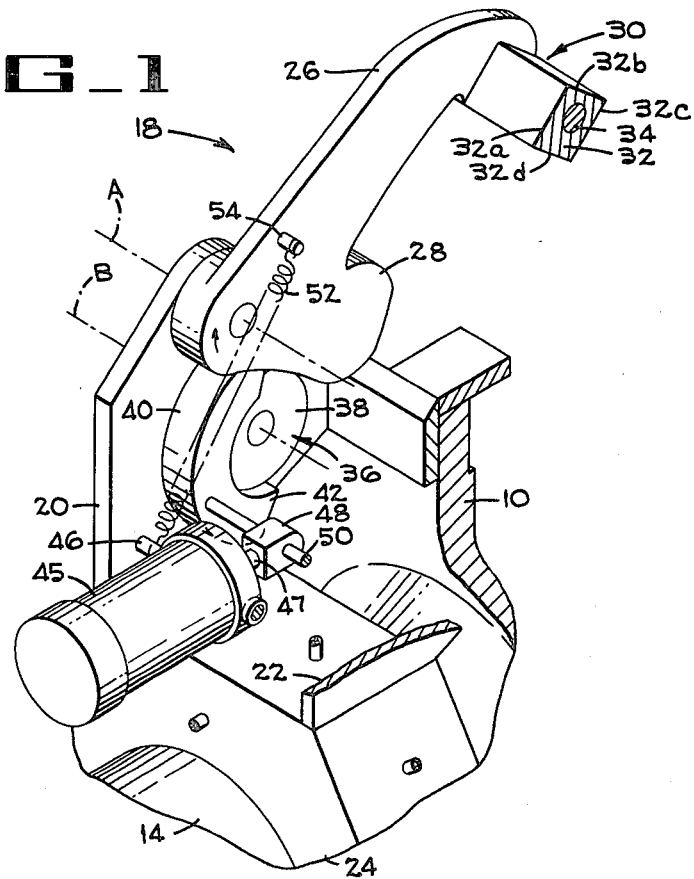
FIG_1
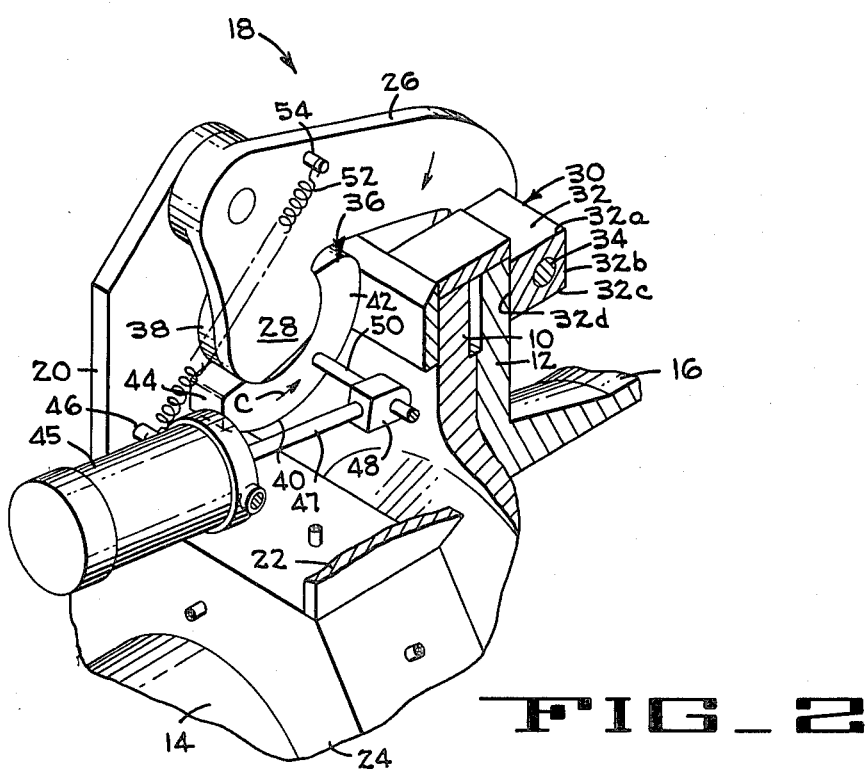
FIG_2

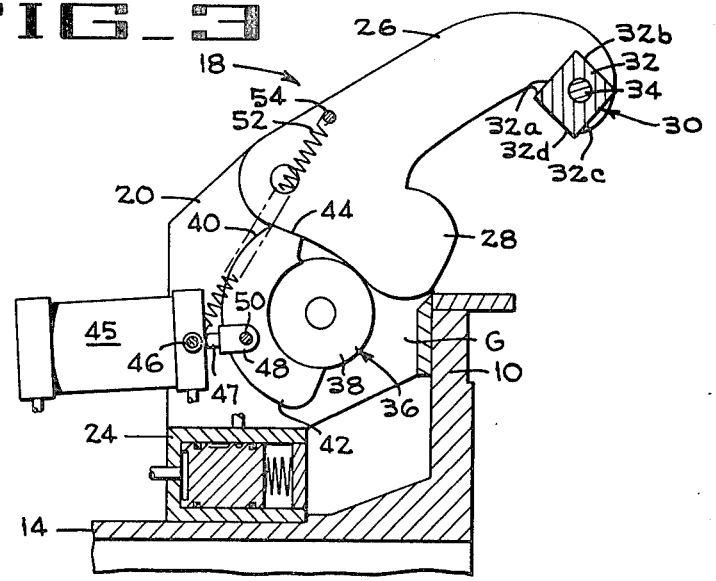
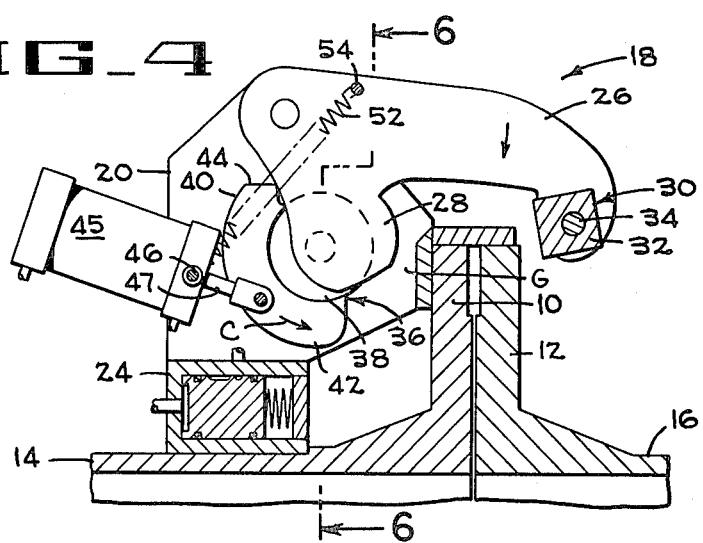
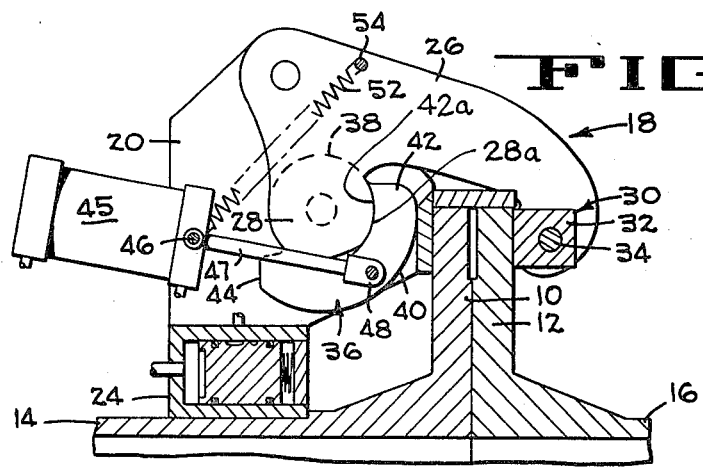

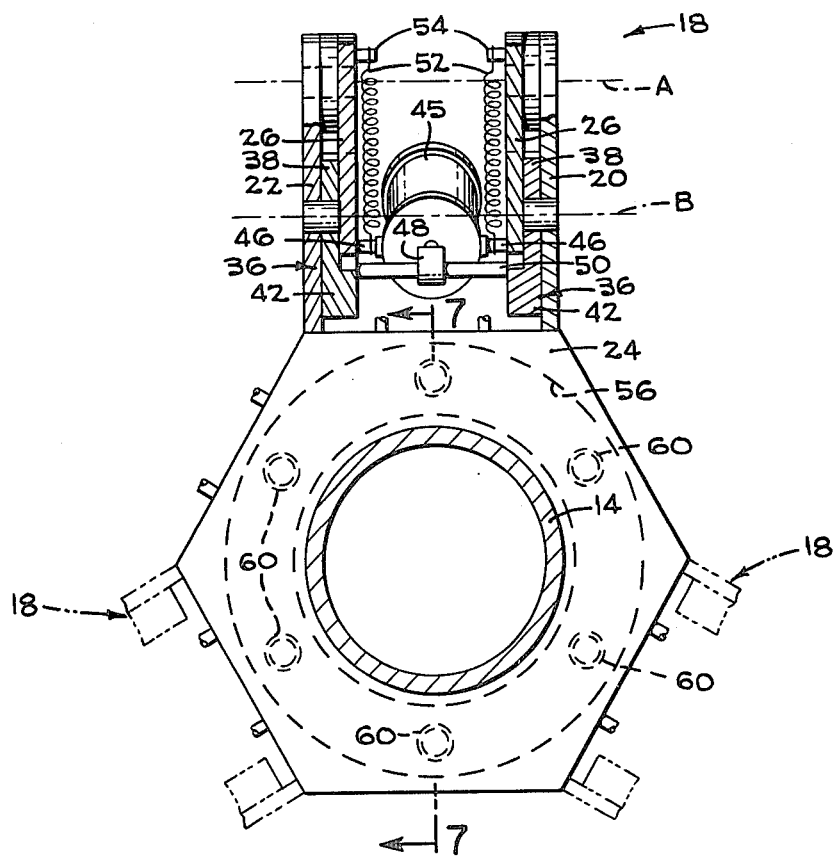
FIG_6
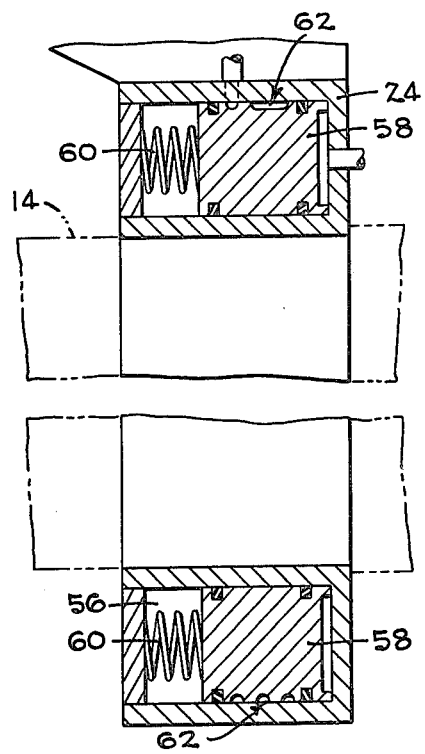
FIG_7

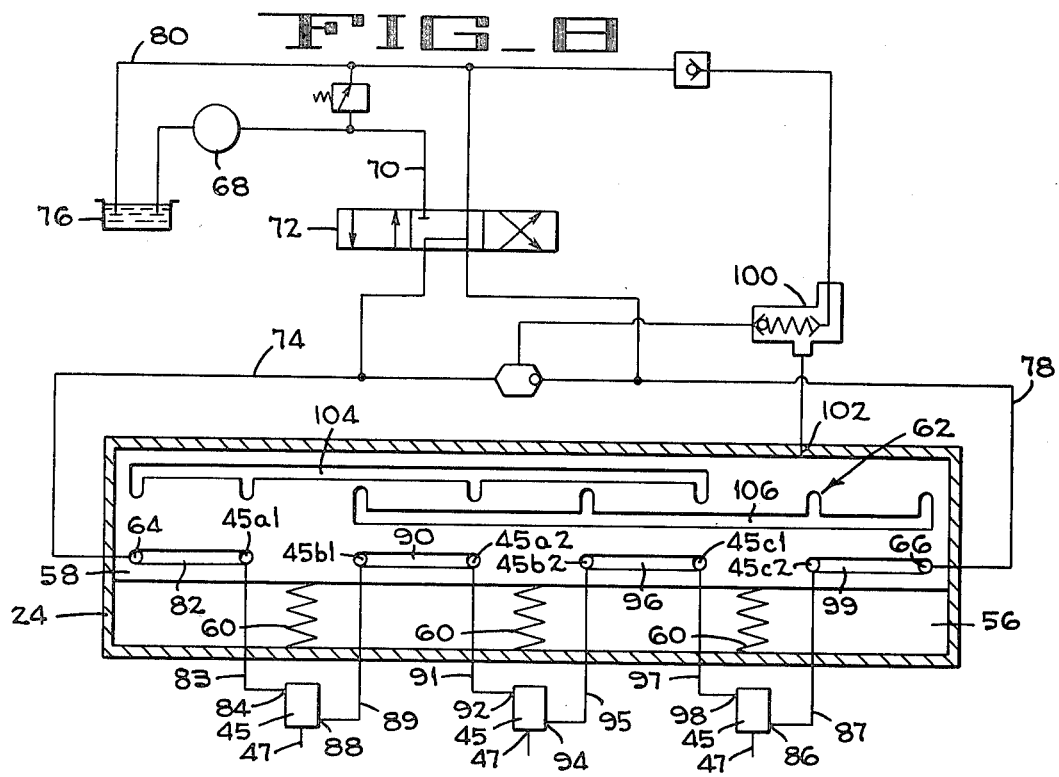
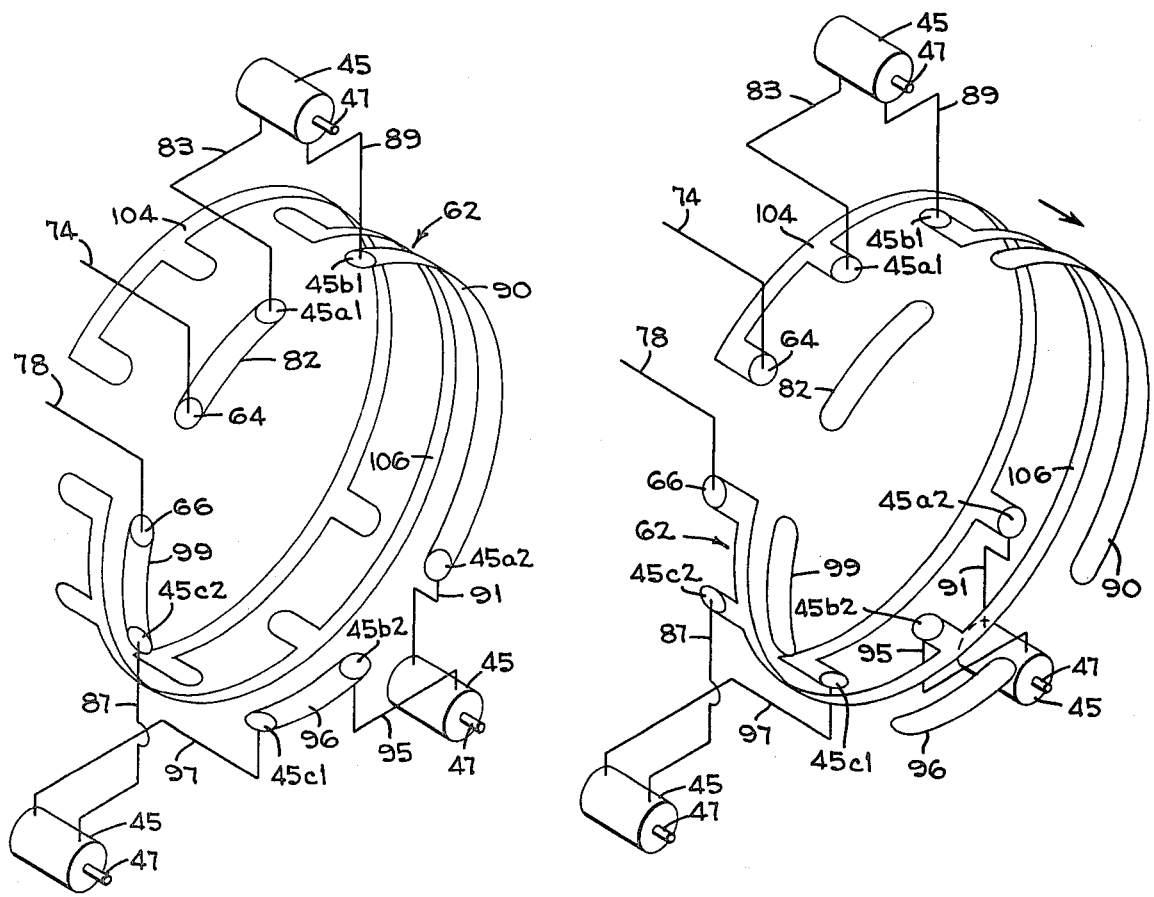

MECHANISM FOR CLAMPING PLATES

BACKGROUND OF THE INVENTION

1. Field of the Invention

This application relates to clamp mechanism, and more particularly, to clamp mechanism of the type to grip the end plates, or flanges, of pipe sections.

2. Description of the Prior Art

Many clamp mechanisms have been disclosed for clamping a pipe section to a flange, or connecting the end flanges of two in-line pipe sections together. Many of these mechanism include clamp members on one pipe with a jaw extending over one of the flanges of the other pipe to pull the flanges together (U.S. Pat. Nos. 3,445,127; 3,586,350; and 3,865,412). Other mechanisms in the prior art include a clamp member pivotally mounted to one pipe section, and having a jaw to swing over and clamp the flange of the adjacent pipe section (U.S. Pat. Nos. 2,834,504; 3,346,281; and 3,442,535). Several prior art patents show mechanisms where the clamping force is exerted by a cam (U.S. Pat. Nos. 1,219,849; 1,991,343; 3,126,213; British Pat. No. 314,569).

SUMMARY OF THE INVENTION

In the preferred form of the present invention, a clamp member is provided having jaws which are a fixed distance apart during the clamping and releasing operation. The clamp member is pivotally mounted adjacent the end plates, or flanges, which are to be secured together, and is biased to swing over the flanges with the jaws straddling the flanges with clearance. A rotary locking member has a wedge segment and an abutment surface. When the locking member is rotated under power in one direction, the abutment surface lifts the clamp member from the flanges; when the locking member is rotated in the opposite direction, the wedge segment is driven between one jaw and the adjacent flanges to tightly secure the flanges together.

It is therefore one object of the present invention to provide a simple, positive acting mechanism to clamp the flanges together with a wedging action.

BRIEF DESCRIPTION OF THE DRAWINGS

FIG. 1 is a view in perspective of the clamp mechanism in a release position.

FIG. 2 is a view taken as the view of FIG. 1 with the clamp member in a clamp position.

FIGS. 3, 4 and 5 are side views, partly in cross-section, of the mechanism of FIG. 1 in the respective positions of release, intermediate, and clamp.

FIG. 6 is a view taken on the line 6—6 of FIG. 4

FIG. 7 is a view taken on the line 7—7 of FIG. 6.

FIG. 8 is a schematic hydraulic diagram for the operation of the clamp mechanism.

FIGS. 9 and 10 show the hydraulic circuit diagrams for the connection of the motors in series and in parallel, respectively.

DESCRIPTION OF THE PREFERRED EMBODIMENT

Apparatus for securing the end flanges 10 and 12 of two in-line pipe sections 14 and 16 is shown in FIGS. 1 to 5. The securing apparatus, indicated generally at 18, is shown in release and clamp positions, respectively, in FIGS. 1 and 2, and shown in release, intermediate and clamp positions respectively in FIGS. 3, 4 and 5. The pipe segment 14 may, for example, be mounted on the deck of an oil tanker and lead to the ship storage tanks. The pipe segment 16 could be the outer arm portion of a loading arm mounted on a dock. Alternatively, the two pipe segments 14, 16 could be portions of a pipeline, located on land or in the sea. As will be described more fully hereinafter, the securing apparatus 18 can be operated from a point remote from the pipeline.

The securing apparatus includes a pair of standards 20, 22 which are mounted on a base, or housing, 24. The housing 24 is secured to the pipe section 14 a short distance from the end flange 10 of that pipe section. A clamp member 26 is mounted for rotation on each standard 20, 22 about a first axis A. The clamp member has an inner jaw 28 and an outer jaw 30. The outer jaw is defined for each clamp member 26 by a jaw bar 32 of square cross-section connected between the outer ends of the clamp members. The jaw bar is mounted eccentrically on a rod 34 and can be manually turned on said rod to present any selected one of the four surfaces of the bar 32a, 32b, 32c or 32d toward the inner jaw. Since the bar is mounted on the rod eccentrically, each face is a slightly different distance from the inner jaw, to accommodate flanges of slightly different thickness. Although the jaw bar is adjustable manually for different flanges, the jaws of the clamp member can be considered as fixed, since they remain the same distance apart during clamping and releasing. In other words, the clamping force is not generated by movable jaws, but is produced by another source as will be described hereinafter.

A locking member 36 is mounted on each standard 20, 22 for rotation about a second axis B spaced from the first axis A. The locking member consist of a hub portion 38 and a semi-circular rim portion 40 secured to the hub portion in spaced relation to the axis B. The rim portion 40 includes a wedging segment 42 at one end and an abutment surface 44 at the opposite end.

The wedging segment 42 is receivable between the jaws of the clamp member (more specifically, between the inner jaw 28 and the adjacent flange 10) when the clamp member 26 is in the closed position and the locking member 36 is rotated in the direction of arrow C. The abutment surface 44 of the locking member engages the rear of the clamp member 26 (as shown in FIG. 4) when the clamp member is in the closed position and the locking member is rotated opposite to arrow C. As rotation of the locking member 36 continues in a direction opposite to the direction of arrow C, the clamp member 26 is lifted from the flanges by the abutment surface 44.

A motor 45 in the form of a hydraulic ram is pivotally connected to trunnions 46 extending, respectively, from the standards 20, 22 (as shown best in FIG. 6). The ram 45 has a piston (not shown) slidably received in the cylinder and has a piston rod 47 connected to the piston and extending from the cylinder. The piston rod 47 has a block 48 at the outer end which receives therein a cross-rod 50. Each end of the cross-rod is connected to the rim portion 40 of the locking members 36.

A spring 52 has one end connected to each truunion 46 and the opposite end to pin 54 secured in the clamp member 26. It will be noted that in all positions of the clamp member 26, the spring lies on the pipe side of the first axis A so that the clamp member is always biased toward the pipe to the close position.

In the release position of clamp member 26 (as shown in FIG. 1) the clamp member is urged by the spring (as well as by gravity) against the abutment surface 44 of the locking member 36. When the flange 12 of another pipe section is placed against the flange 10, the ram is operated to extend rod 47, and the rim portion 40 wedging segment is rotated toward the flange 10. As the rim portion rotates the abutment surface 44 moves away from the clamp member 26 and the clamp member is lowered. The wedging segment 42 (which is of narrower width at the leading edge) is driven by the ram into the gap G between the inner jaw 28 and the adjacent flange 10. A cam surface 42a (FIG. 5) on the wedging segment 42 presses against a cam surface 28a on the inner jaw 28 causing the clamp member 26 to rotate clockwise about the axis A. This clockwise rotation of clamp member 26 causes the jaw bar 32 to press the flange 12 into firm engagement with flange 10, and to clamp the flanges 10 and 12 tightly together between the outer jaw bar 32 and the wedging segment 42.

Preferably, three securing mechanisms 18 are provided for each pair of flanges it is desired to clamp together, as shown in FIG. 6. A hydraulic control system has been provided to operate the three hydraulic rams 45. In the early portion of the cycle of closing the clamp members 26, the rams are operated in series for maximum speed. In the final stage of the clamp closing cycle, the three rams are operated in parallel for maximum force.

The housing 24, which provides a base of standards 20, 22, has therein an annular chamber 56, as shown best in FIG. 7. An annular piston 58 is received in the chamber and is based therein against one end of the chamber by springs 60. A plurality of grooves, indicated as a whole by numeral 62, is cut in the outer surface of the piston.

The arrangement of the grooves 62 on the piston is shown best in FIGS. 8 and 9. Valve ports 64, 66, and motor ports 45a1, 45b1, 45a2, 45b2, 45c1, 45c2, are provided in the housing 24. Hydraulic pump 68 is connected through pressure line 70, reversing valve 72, and motor line 74 to valve port 64 when the reversing valve is shifted to the right as viewed in FIG. 8. With the reversing valve in this position, valve port 66 is connected to the sump 76 through motor line 78, the reversing valve 72, and return line 80.

In order to effect a clamping operation, the reversing valve (which may be located remote from the pipeline) is operated to place pressure at port 64 and to connect port 66 to the return line. When this is done, pressure is applied through groove 82, port 45a1, and line 83 to the rear port 84 in the first ram 45. At the same time, the front port 86 in the third ram is opened to exhaust through line 87, port 45c2, groove 99 and port 66, and all cylinders advance. The fluid in front of the piston in the first ram is forced out of front port 88, through line 89, port 45b1, groove 90, port 45a2, and line 91 to the rear port 92 of the second ram. The pressure exerted behind the piston in the second ram, in turn, forces fluid out the front port 94 thereof and through line 95, port 45b2, groove 96, port 45c1, and line 97 into the rear port 98 of the third ram. In this manner, all pistons advance simultaneously from the force exerted on the first piston in the series chain of the first, second and third rams 45. Since the pump need only supply enough fluid to fill the first ram behind the piston, the pistons move relatively rapidly as long as the pistons do not encounter significant resistance.

When resistance is encountered (as when the wedging segment is being driven home between the inner clamp jaw and the adjacent flange) pressure builds up in motor line 74 to a value great enough to open relief valve 100 and pass fluid therethrough to the operating port 102 of housing 24. When fluid under pressure passes through port 102, piston 58 is advanced to bring another set of grooves into registration with the ports 64, 45a1, 45b1, 45a2, 45b2, 45c1 and 45c2 and 66 in the housing 24.

After the piston 58 shifts forwardly, all ports in the housing are connected to one or the other of two grooves 104, 106. The ports 64, 45a1, 45a2 and 45c1 are in communication with groove 104, and the ports 45b1, 45b2, 45c2 and 66 are in communication with groove 106. Thus, fluid under pressure is directed through line 74, port 64, and groove 104 to the rear port of each of the rams 45 as follows: to the rear port 84 of the first ram through port 45a1 and line 83; to the rear port 92 of the second ram through port 45a2 and line 91; to the rear port 98 of the third ram through port 45c1 and line 97. The front ports of all of the rams are connected to exhaust by way of port 66 and line 78 as follows: the front port 88 of the first ram is connected by line 89 to port 45b1, and groove 106 to port 66; the front port 94 of the second ram is connected by line 95 to port 45b2 and groove 106 to port 66; and the front port 86 is connected by line 87, port 45c2, and groove 106, to port 66.

When the reversing valve is shifted to the extreme left to retract the wedging member and lift the clamp member, the port 66 is connected to pressure through line 78, the valve 72 and line 70 to the pump 68. Port 64 is connected to the sump 76 by way of line 74, valve 72 and line 80. The ball in the sequencing valve 108 shifts to the left so that relief valve 100 is connected to port 66. If the piston rods 47 of the rams 45 meet resistance in retracting from the clamp jaws, the piston 58 is shifted to the parallel mode of operation (FIG. 10) until the wedge is retracted. Thereafter, the low resistance to movement of the locking member drops the pressure in line 78, and at port 102, so the springs 60 shift piston 58 to the series mode of operation (FIG. 9). Thus, the clamps quickly rise to the release position (FIG. 1).

Although the best mode contemplated for carrying out the present invention has been herein shown and described, it will be apparent that modification and variation may be made without departing from what is regarded to be the subject matter of the invention.

What is claimed is:

1. Apparatus for securing together the end flanges of two adjacent pipes comprising a clamp member having two jaws to embrace with clearance said two flanges, means for rotatably mounting said clamp member adjacent said flange, a rotary wedge member received between one of said jaws and the adjacent flange, and means to rotate said wedge member into the gap between said one jaw and said adjacent flange causing said clamp member to rotate and to force the other jaw against the other flange to clamp the flanges together between said wedge member and said other jaw.

2. Apparatus for securing together the end flanges of two adjacent pipes comprising a standard adjacent said flanges, a clamp member rotatably mounted on said standard, said clamp member having two jaws to embrace with clearance said flanges, a rotary wedge member mounted on said standard, said wedge member receivable between one of said jaws and the adjacent flange, and means to rotate said wedge member into the gap between said one jaw and said adjacent flange, said wedge member pressing against said one jaw causing the said clamp member to rotate and to force the other jaw against the other flange to clamp the flanges together between said wedge member and said other jaw.

3. Apparatus for securing together the end flanges of two adjacent pipes comprising a standard mounted on one of said pipes, a clamp member rotatably mounted on said standard, said clamp member having two jaws to embrace said flanges with clearance, a rotary wedge member mounted on said standard, said wedge member receivable between one of said jaws and the adjacent flange, and a power operated motor mounted on said standard to rotate said wedge member into the gap between said one jaw and said adjacent flange, said wedge member pressing against said one jaw and said adjacent flange causing said clamp member to rotate and to force the other jaw against the other flange to clamp the flanges together between said wedge member and the other jaw.

4. Apparatus for securing together the end flanges of two adjacent pipes comprising a standard mounted on one of said pipes, a clamp member rotatable mounted on said standard for rotation about a first axis, said clamp member having two jaws to embrace said flanges with clearance, a rotary locking member rotatably mounted on said standard for rotation about a second axis spaced from said first axis, an arcuate wedge segment mounted on said locking member in spaced relation to said second axis, said wedge segment receivable between one of said jaws and the adjacent flange, and a power operated motor mounted on said standard to rotate said wedge segment into the gap between said one jaw and said adjacent flange to rotate said clamp member against the other jaw to clamp the flanges together between said wedge segment and the other jaw.

5. Apparatus for securing together the end flanges of two adjacent pipes comprising a standard mounted on one of said pipes, a clamp member rotatably mounted on said standard for rotation about a first axis, said clamp member having two jaws to embrace said flanges with clearance, a rotary locking member rotatably mounted on said standard for rotation about a second axis spaced from said first axis, an arcuate wedge segment mounted on said locking member in spaced relation to said second axis, one end of said wedge segment receivable between one of said jaws and the adjacent flange upon rotation of the locking member in one direction to clamp the two flanges and the one end of the wedge segment between the jaws of the clamp member, the opposite end of said wedge segment engageable with the clamp member upon rotation of the locking member in the other direction to lift clamp member from the flanges, and a power operating motor mounted on said standard to rotate said locking member selectively in one direction to lower the clamp member and insert the wedge segment between one jaw and the adjacent flange and in the opposite direction to withdraw the wedge segment from between said jaw and said adjacent flange and raise the clamp member.

6. Apparatus for securing together the flanges of adjacent pipes as defined in claim 7 wherein said apparatus comprises a plurality of hydraulically actuated clamps spaced around said flanges, a source of fluid under pressure, means defining a hydraulic circuit to connect said source to said clamps for actuation of the clamps, said circuit having a first branch to effect a connection of said clamps in series to said source and having a second branch to effect a connection of said clamps in parallel to said source, means to render a selected one of said branches effective and the other ineffective and, alternatively, to render said other branch effective and said one branch ineffective.

7. Mechanism to secure two flanges together comprising a clamp member having a pair of jaws, said clamp member mounted for rotation about a first fixed axis to swing between a clamp position with said jaws straddling said flanges and a release position, a locking member mounted for rotation about a second fixed axis spaced from said first axis, said locking member having means spaced from said second axis including a wedging segment and an abutment surface, and means to rotate said locking member in one direction to drive said wedging segment between one of said jaws and an adjacent flange, said wedging segment causing said clamp member to rotate and press the other jaw against the other flange to clamp the flanges together, and means to rotate said locking segment in the opposite direction to lift the clamp member from the flanges with the abutment surface.

8. Mechanism to secure two flanges together comprising a clamp member having a pair of jaws, said clamp member mounted for rotation about a first fixed axis to swing between a clamp position with said jaws straddling said flanges and a release position, means to bias said clamp member toward the clamp position, a locking member mounted for rotation about a second fixed axis spaced from said first axis, said locking member having a wedging segment and an abutment surface spaced from said second axis, and a reversible motor to rotate said locking member in one direction to drive said wedging segment between one of the jaws of the clamp member and an adjacent flange causing said clamp member to rotate and press the other jaw against the other flange to clamp the flanges together between said clamp member and said other jaw when in the clamp position and to rotate said locking member in the opposite direction to lift the clamp member from the clamp position with said abutment surface.

* * * * *